United States Patent
Chen et al.

(10) Patent No.: US 10,083,125 B2
(45) Date of Patent: *Sep. 25, 2018

(54) METHOD TO EFFICIENTLY IMPLEMENT SYNCHRONIZATION USING SOFTWARE MANAGED ADDRESS TRANSLATION

(71) Applicant: International Business Machines Corporation, Armonk, NY (US)

(72) Inventors: Tong Chen, Yorktown Heights, NY (US); John Kevin O'Brien, South Salem, NY (US); Zehra Noman Sura, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,307

(22) Filed: Feb. 14, 2017

(65) Prior Publication Data

US 2017/0153985 A1   Jun. 1, 2017

Related U.S. Application Data

(63) Continuation of application No. 14/662,789, filed on Mar. 19, 2015.

(51) Int. Cl.
G06F 12/10 (2016.01)
G06F 12/1027 (2016.01)
G06F 12/1009 (2016.01)

(52) U.S. Cl.
CPC ...... *G06F 12/1027* (2013.01); *G06F 12/1009* (2013.01); *G06F 2212/65* (2013.01); *G06F 2212/68* (2013.01)

(58) Field of Classification Search
CPC ........ G06F 11/3632; G06F 8/65; G06F 8/751; G06F 9/4552; G06F 11/28; G06F 11/073;
(Continued)

(56) References Cited

U.S. PATENT DOCUMENTS 6,021,481 A    2/2000  Eickemeyer et al.
6,934,832 B1 *  8/2005  Van Dyke ........... G06F 9/30174
                                              712/244
(Continued)

FOREIGN PATENT DOCUMENTS

WO       2013119211 A1   8/2013

OTHER PUBLICATIONS

List of IBM Patents or Patent Applications Treated as Related.
(Continued)

*Primary Examiner* — Pierre Miche Bataille
(74) *Attorney, Agent, or Firm* — Patent Portfolio Builders PLLC

(57) ABSTRACT

Software-managed resources are used to utilize effective-to-real memory address translation for synchronization among processes executing on processor cores in a multi-core computing system. A failure to find a pre-determined effective memory address translation in an effective-to-real memory address translation table on a first processor core triggers an address translation exception in a second processor core and causes an exception handler on the second processor core to start a new process, thereby acting as a means to achieve synchronization among processes on the first processor core and the second processor core. The specific functionality is implemented in the exception handler, which is tailored to respond to the exception based on the address that generated it.

20 Claims, 3 Drawing Sheets

(58) Field of Classification Search
CPC ............ G06F 11/0772; G06F 11/0793; G06F 12/1027; G06F 2212/684
USPC ................................................ 711/206, 207
See application file for complete search history.

(56) References Cited

U.S. PATENT DOCUMENTS

| | | | |
|---|---|---|---|
| 7,188,229 B2* | 3/2007 | Lowe | G06F 12/1027 |
| | | | 711/118 |
| 7,617,380 B2 | 11/2009 | So et al. | |
| 8,095,771 B2 | 1/2012 | Sheu et al. | |
| 8,645,666 B2 | 2/2014 | Glew | |
| 2008/0126866 A1 | 5/2008 | Hopkinson | |
| 2009/0187750 A1* | 7/2009 | Bugnion | G06F 9/45504 |
| | | | 712/244 |
| 2012/0011342 A1* | 1/2012 | Ingle | G06F 12/1027 |
| | | | 711/207 |
| 2012/0144167 A1* | 6/2012 | Yates, Jr. | G06F 9/30174 |
| | | | 712/216 |
| 2013/0262816 A1 | 10/2013 | Ronen et al. | |
| 2014/0040592 A1 | 10/2013 | Fleischer et al. | |
| 2014/0040603 A1 | 2/2014 | Fleischer et al. | |
| 2015/0205535 A1 | 7/2015 | Joshi et al. | |

OTHER PUBLICATIONS

Wu et al., "An Effective Synchronization Approach for Fast and Accurate Multi-core Instruction-set Simulation", EMSOFT '09, Oct. 12-16, 2009.
Zhou et al., "iWatcher: Simple, General Architectural Support for Software Debugging", International Symposium on Computer Architecture, ISCA, IEEE Micro Nov.-Dec. 2004, pp. 50-56.

* cited by examiner

METHOD TO EFFICIENTLY IMPLEMENT SYNCHRONIZATION USING SOFTWARE MANAGED ADDRESS TRANSLATION

CROSS-REFERENCE TO RELATED APPLICATIONS

The present application is a continuation of U.S. patent application Ser. No. 14/662,789 filed Mar. 19, 2015, which issued as U.S. Pat. No. 9,658,940 on May 23, 2017. The entire disclosure of this application is incorporated herein by reference.

STATEMENT REGARDING FEDERALLY SPONSORED RESEARCH OR DEVELOPMENT

This invention was made with Government support under Contract No.: B599858 awarded by the Department of Defense. The Government has certain rights in this invention.

FIELD OF THE INVENTION

The present invention relates to multi-core execution of software applications.

BACKGROUND OF THE INVENTION

Software applications take advantage of multiple processor cores to execute processes in parallel. The multiple processor cores can be processor cores from separate computers, servers or computing systems or multiple processor cores on a single processor chip. Execution of processes among the plurality of processor cores includes accessing data, which are typically arranged as data pages, by the various processor cores. Accessing data pages and executing processes between a given pair of processor cores may require synchronization between those processor cores, and the software applications that utilize multiple cores for execution need an efficient method to synchronize between cores. A common method for efficient synchronization uses a hardware instruction that performs atomic compare-and-update operations. For producer-consumer synchronization in particular, this requires instructions to be generated explicitly for this purpose in both the producer and consumer code. Therefore, solutions for providing synchronization between processor cores without having to modify the producer and consumer code are desired.

SUMMARY OF THE INVENTION

Systems and methods in accordance with the present invention utilize software-managed resources to achieve effective-to-real memory address translation (ERAT) and synchronization among processes in a multi-core computing system, reducing overhead and performance degradation for application behaviors, for example, producer-consumer and breakpoint insertion, among others, with minimal impact to the program. In one embodiment, a failure to find a pre-determined effective memory address translation in the ERAT table associated with a first processor core, e.g., a producer processor core, triggers an exception in a second processor core, i.e., a host processor core. This causes the exception handler on the second processor core to initiate an action, for example, the start of a new process, thereby acting as a means to achieve synchronization between the first processor core and the second processor core. In addition, the exception handler provides the needed address translation for insertion into the ERAT table. In one embodiment, a specific processing functionality is implemented in the exception handler in response to the address translation exception associated with a particular pre-determined effective memory address that generated the address translation exception. Therefore, processes beyond just synchronization are executed in response to an address translation exception.

The present invention utilizes the mechanism for ERAT mappings to also perform synchronization in systems with support for software-directed ERAT, such as AMC lane architecture, CAPI-attached accelerators in a POWER system and heterogeneous systems with separate physical memories and support for unified virtual memory across them. In one embodiment, the computing system includes special-purpose accelerator cores, for example, the AMC system, where address translation for an accelerator core is provided by the operating system (OS) running on a separate general-purpose processor core or host core. The address translation mechanism is used to implement synchronization in accordance with the present invention. In one embodiment, the synchronization is producer-consumer synchronization, where the producer code executes on the accelerator core and the consumer code executes on the host core. In the application running on the processor cores, the synchronization point in the code that will execute on the accelerator core is identified by a memory access to a particular virtual address. When the host is invoked to perform address translation for this particular virtual address, it also triggers execution of the consumer code. The application code is generated such that it guarantees an ERAT miss will occur when a particular pre-determined effective or virtual address is accessed during execution on the accelerator core. This results in an interrupt on the host. The application registers a software handler that executes on the host when an interrupt is received for an ERAT miss. This handler code results in the execution of the consumer code when the ERAT miss is for the particular virtual address used for synchronization.

Exemplary embodiments in accordance with the present invention facilitate synchronization without adding any instructions in the producer code. Besides using fewer instructions, the present invention has an additional advantage when automatically optimizing code using a compiler. The technique makes it possible to retain the original structure of the code, such as well-nested loops where the synchronization is done at an intermediate loop level, enabling some compiler optimizations that would otherwise not be applicable, e.g., polyhedral loop transformations.

In one exemplary embodiment, the present invention is directed to a method for synchronizing cores in a multi-core computing environment. In one embodiment, a pre-determined effective memory address is selected. An effective-to-real address translation table without a corresponding real memory address translation entry for the pre-determined effective memory address is maintained, for example at a first processor core in the multi-core computing environment. A process, i.e., a software or computing process, is executed on a first processor core. This process accesses the pre-determined effective memory address. In addition, this process requires synchronization between the first processor core and a second processor core. As the corresponding real memory address translation entry is not maintained in the effective-to-real address translation table, an address translation exception is triggered in the effective-to-real address translation table that is associated with access of the pre-determined effective memory address.

In response to the address translation exception, exception handler software code is executed. In one embodiment, the address translation exception is triggered on a host processor core, and the exception handler code is executed on the host processor core. In one embodiment, the host processor core is the second processor core, and the first processor core is an accelerator processor core. The exception handler software code is used to effect synchronization between the first processor core and a second processor core. In one embodiment, using the exception handler software code to effect synchronization also includes executing additional or process specific software code that initiates a new process on the second processor core. In addition to synchronization and initiating new processes, the effective-to-real address translation table is updated to include the corresponding real memory address translation entry for the pre-determined effective memory address in response to the address translation exception.

In one embodiment a plurality of pre-determined effective memory addresses is selected, and the effective-to-real address translation table is maintained without a corresponding real memory address translation entry for each one of the plurality of pre-determined effective memory addresses. One of the plurality of pre-determined effective memory addresses is accessed, and the exception handler software code is used to execute specific process thread software code corresponding to the one of the plurality of pre-determined effective memory addresses accessed by the process. Executing the specific process thread software code co-ordinates execution of the process between the first processor core and the second processor core. In addition, this specific process thread software code also performs runtime profiling, performs book-keeping for dynamic resource allocation, debugs the process or inserts a breakpoint.

Exemplary embodiments are also directed to a multi-core computing environment that includes a first processor core containing an effective-to-real address translation table without a corresponding real memory address translation entry for a pre-determined effective memory address. A process is executing on a first processor core that accesses the pre-determined effective memory address, and the multi-core computing environment also includes a second processor core in communication with the first processor core. Exception handler software code is resident on the second processor core. The exception handler software code executes in response to an address translation exception in the effective-to-real address translation table raised on the second processor core in response to the access of the pre-determined effective memory address. This execution of the exception handler software code affects or causes synchronization between the first processor core and the second processor core.

In one embodiment, the first processor core is an accelerator processor core, and the second processor core comprises a host processor core. In one embodiment, the process is a process requiring synchronization between the first processor core and the second processor core. In one embodiment, a plurality of first processor cores is provided. Each has a separate effective-to-real address translation table without a corresponding real memory address translation entry for a distinct pre-determined effective memory address. A plurality of processes are running, and a given process executing on one of the first processor cores accesses the distinct pre-determined effective memory address in the effective-to-real address translation table on the first processor core on which the given process is executing. A plurality of second processor cores are also included where each second processor core is in communication with one of the first processor cores. Exception handler software code is resident on each second processor core. The exception handler software code on a given second processor core executes in response to an address translation exception in the effective-to-real address translation table raised on the given second processor core in response to access of the distinct pre-determined effective memory address in the first processor core that is in communication with the given second processor core. Execution of the exception handler software code effects synchronization between the first processor core and the given second processor core.

DETAILED DESCRIPTION

Figure 1:
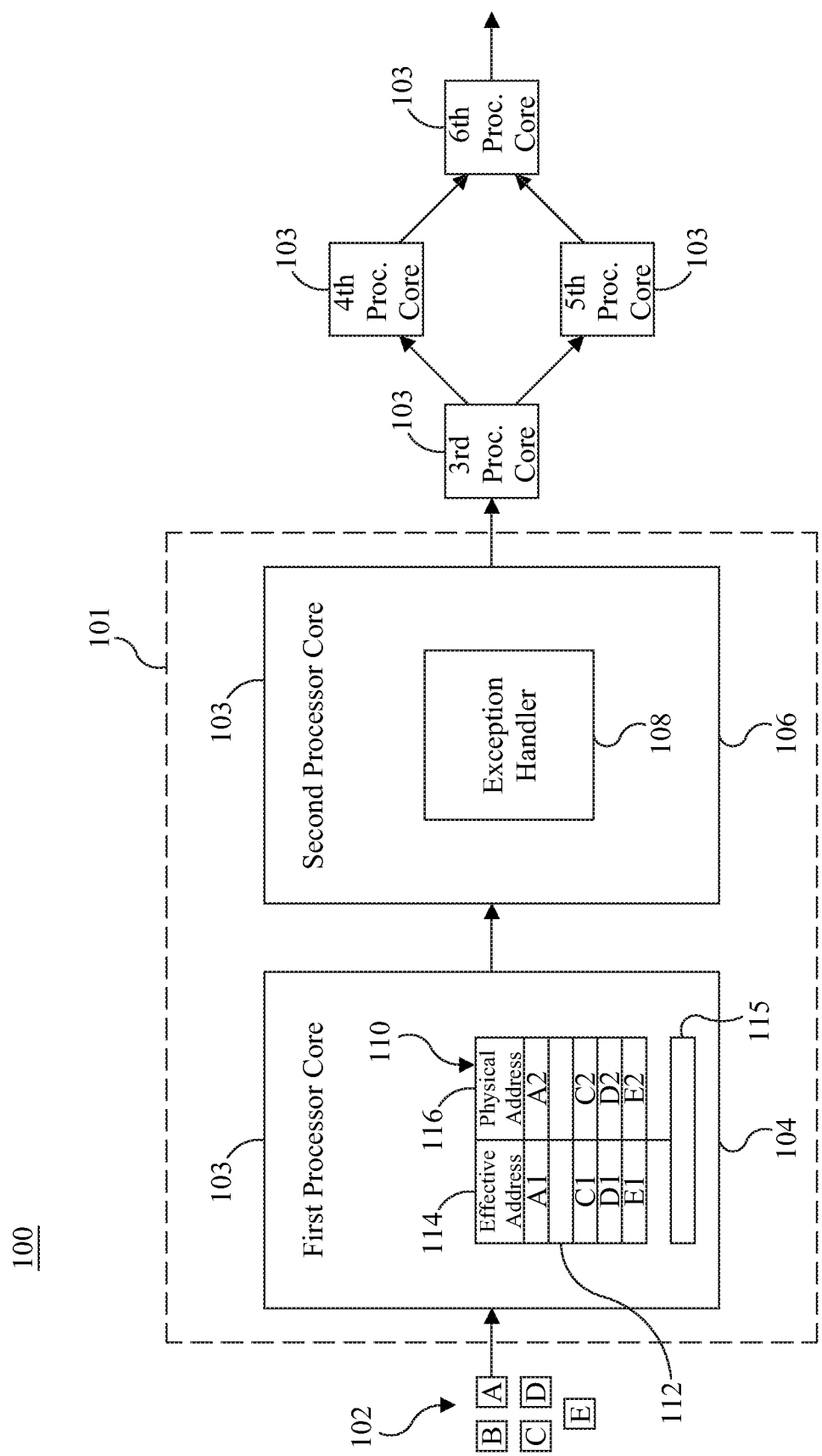
FIG. 1 is a schematic representation illustrating an embodiment of a multi-core computing environment in accordance with the present invention.

Referring initially to FIG. 1, exemplary embodiments in accordance with the present invention are directed to a multi-core computing environment 100 that includes a plurality of processor cores 103. These processors cores execute processes from one or more software applications running in the multi-core computing environment. The plurality of processor cores includes multiple cores on a single processor chip or multiple cores across multiple processor chips or computing systems. The processor cores are arranged to execute processes from the software applications in series, in parallel or in a combination of series and parallel configurations. Execution of the processes includes accessing data arranged as a plurality of data pages 102 by the plurality of processor cores, which requires synchronization among the processes executing on the plurality of processor cores.

As illustrated, the multi-core computing environment includes one or more pairs 101 of processor cores executing processes in series for one or more software applications. The pair of processor cores includes a first processor core 104 in communication with a second processor core 106. In one embodiment, the first processor core is an accelerator or producer processor core, and the second processor core is a host or consumer processor core. The first processor core includes an effective-to-real address translation (ERAT) table 110 that includes an effective or virtual memory address column 114 and a physical or real memory address column 116. The ERAT table provides effective to real memory address translations for the memory data pages 102 accessed by the processes executing on the processor cores. Each row provides the translation of one memory page. A memory address translation exception occurs when a process attempts to access an effective memory location whose address cannot be translated using the entries resident in the ERAT table of the processor core that is attempting the access.

These memory address translation exceptions are utilized to provide synchronization, or any number of additional processes, in response to a memory access. Therefore, the ERAT table in the first processor core has a missing corresponding real memory address translation entry 112 for a pre-determined effective memory address. This pre-determined effective memory address is utilized by the present invention to effect synchronization. In one embodiment, the ERAT table in the first processor core has missing corresponding real memory address translation entries 112 for a plurality of pre-determined effective memory addresses. Each pre-determined effective memory address is utilized by the present invention to execute a unique given specific process thread software code that can optionally provide synchronization, co-ordinate execution of the process between the first processor core and the second processor core, perform runtime profiling, perform book-keeping for dynamic resource allocation, debug the process or insert a breakpoint.

The multi-core computing environment includes at least one process executing on the first processor core. This process accesses the ERAT table and in particular, the pre-determined effective memory address for which no translation is at least initially maintained in the ERAT table. An exception handler software code 108 is resident on the second processor core 106. The exception handler software code executes in response to an address translation exception in the effective-to-real address translation table that is raised on the second processor core in response to the access of the pre-determined effective memory address by the process running on the first processor core. Execution of the exception handler software code effects synchronization between the first processor core and the second processor core.

While illustrated for a single pair of processor cores, the multi-core computing system can include a plurality of pairs of processor cores representing a plurality of first processor cores in communication with a plurality of second processor cores. Each first processor core includes a separate effective-to-real address translation table without a corresponding real memory address translation entry for one or more distinct pre-determined effective memory addresses. A plurality of processes are executing in the multi-core computing system such that a given process executes on one of the first processor cores and accesses the distinct pre-determined effective memory address in the effective-to-real address translation table on the first processor core on which the given process is executing. Each second processing core is in communication with one of the first processor cores and includes resident exception handler software code. The exception handler software code on a given second processor core executes in response to an address translation exception in the effective-to-real address translation table on a first processor core raised on that given second processor associated with the first processor core. This address translation exception is raised in response to access of the distinct pre-determined effective memory address in the first processor core that is in communication with the given second processor core. Execution of any given exception handler software code effects synchronization between the first processor core and the given second processor core associated with that exception handler software code.

Figure 2:
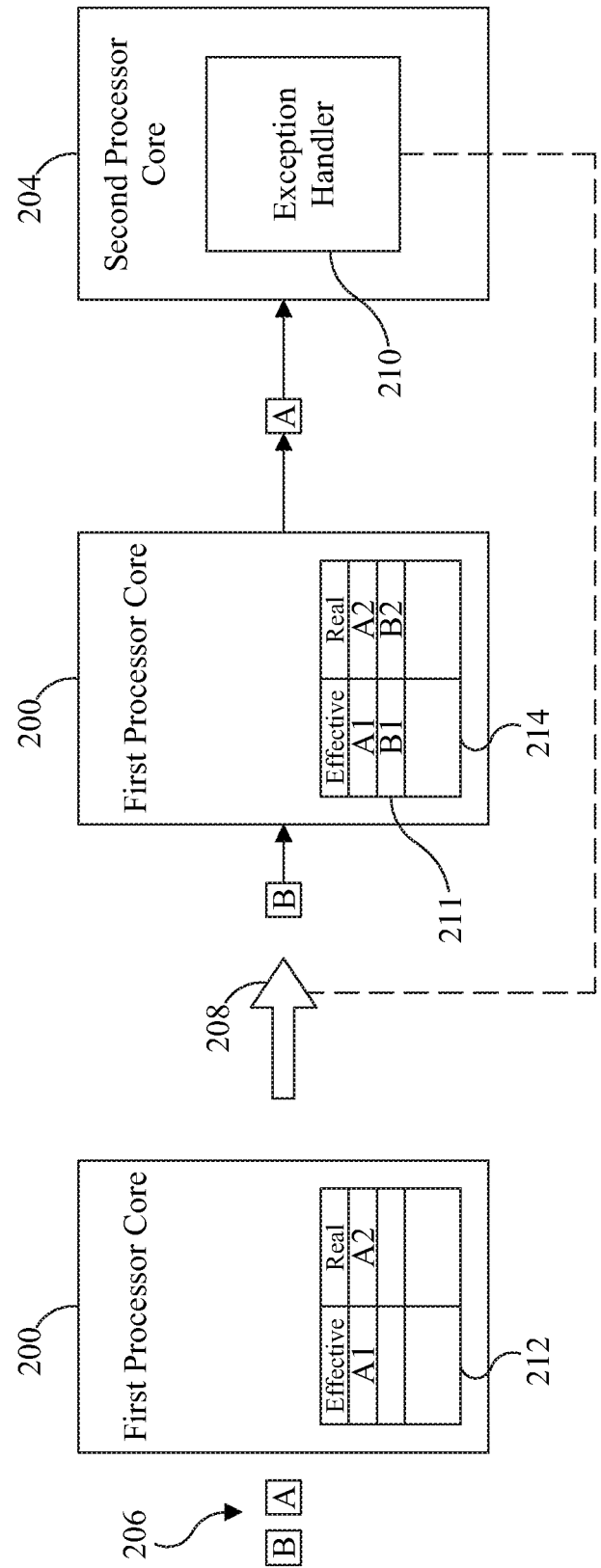
FIG. 2 is a schematic representation illustrating an embodiment of the creating of an address translation exception, triggering of an exception handler and updating of an ERAT table in accordance with the present invention.

Referring to FIG. 2, an embodiment of the use of the ERAT table on a first processor core to effect synchronization with a second processor core is illustrated. Initially, the first processor core 200 includes an ERAT table 212 that is used to provide translations for the effective addresses associated with pages of data 206 that are accessed by processes running on the first processor core. As was discussed above, the translation between effective and real memory addresses is not maintained in the ERAT table 212 for one of the pre-determined effective memory addresses associated with one of the pages of data, B. Attempts to access this pre-determined effective memory address raises an address translation exception 208 in the second processor core 204. This pre-determined effective memory address is communicated to the exception handler software running on the second processor core. The exception handler software recognized the pre-determined effective memory address and in response effects synchronization between the first processor core and the second processor core. In addition, the exception handler updates the ERAT table 214 in the first processor core to include the translation for the pre-determined effective memory address.

Figure 3:
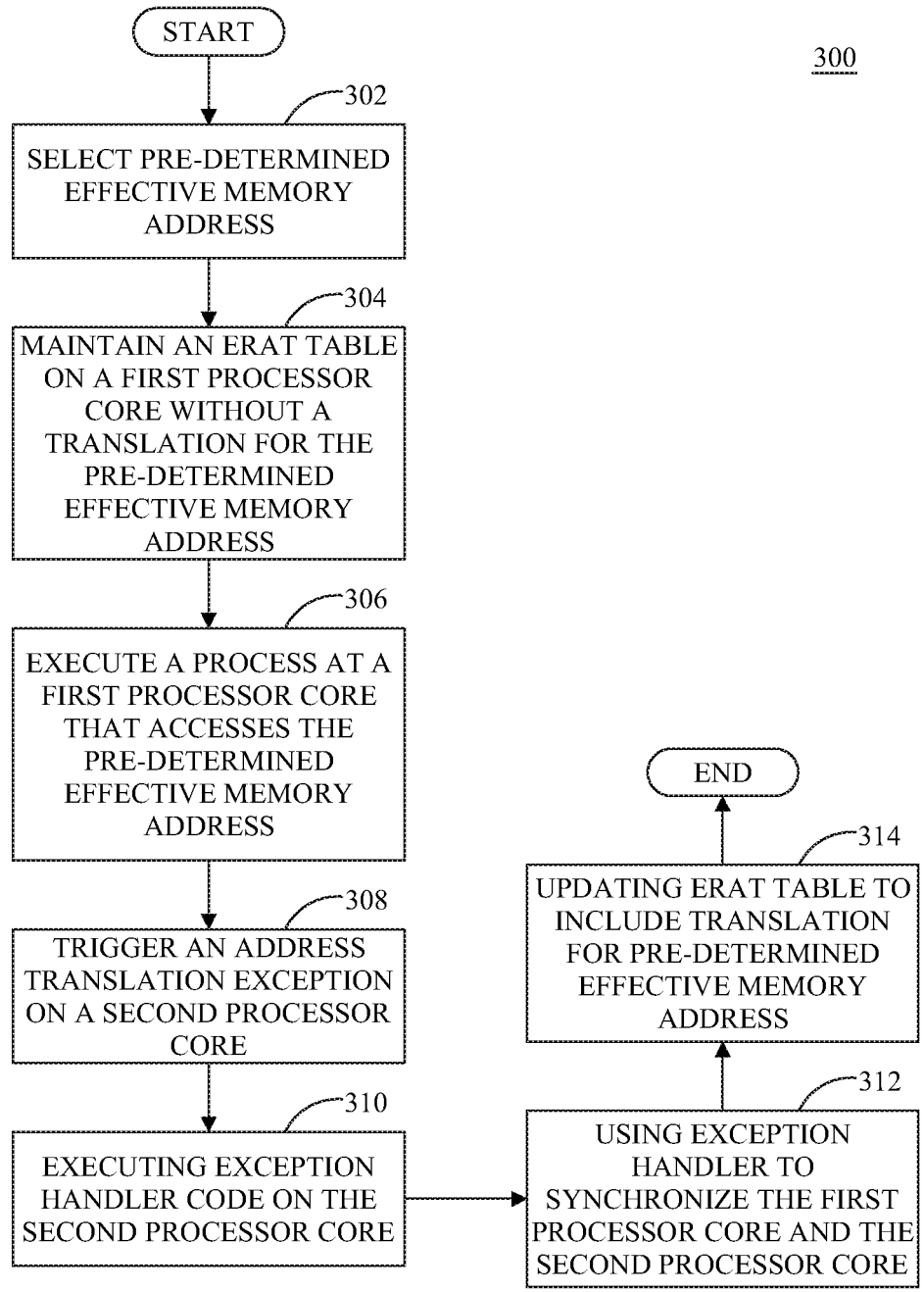
FIG. 3 is a flow chart illustrating an embodiment of a method for synchronizing cores in a multi-core computing environment in accordance with the present invention.

Referring to FIG. 3, exemplary embodiments in accordance with the present invention are also directed to a method for synchronizing cores in a multi-core computing environment 300. In accordance with this method, at least one pre-determined effective or virtual memory address is selected 302. An effective-to-real address translation table without a corresponding real memory address translation entry for the pre-determined effective memory address is maintained 304. In one embodiment, the effective-to-real address translation table is maintained at the first processor core.

A process for a software application that accesses the pre-determined effective memory address is executed on a first processor core 306. This process requires synchronization between the first processor core and a second processor core. An address translation exception occurs in the effective-to-real address translation table that is associated with access of the pre-determined effective memory address and is triggered on a second processor core 308. Based on this exception, exception handler software code is executed on the second processor core 310. In one embodiment, the first processor core is an accelerator processor core, and the second processor core is a host processor core. Executing the exception handler code includes executing the exception handler code on the host processor core, and the ERAT table is in the accelerator processor core.

The exception handler software code is used to effect synchronization between the first processor core and a second processor core 312. In addition, the exception handler software code may be used to execute software code that initiates a new process on the second processor core. In one embodiment, the effective-to-real address translation table is updated to include the corresponding real memory address translation entry for the pre-determined effective memory address in response to the address translation exception 314.

The method for synchronizing cores in a multi-core computing system can also be used with a plurality of pre-determined effective memory addresses, where each pre-determined effective memory address is associated with the execution of a given process by the exception software handler. In this embodiment, a plurality of pre-determined effective memory addresses is selected, and the effective-to-real address translation is maintained without a corresponding real memory address translation entry for each one of the plurality of pre-determined effective memory addresses. The process executing on the first processor core accesses one of the plurality of pre-determined effective memory addresses, which raises the address translation exception on the second processor core. The exception handler software code in addition to effecting synchronization, recognizes the one of the plurality of pre-defined effective memory addresses that is accessed, and executes specific process thread software code corresponding to the one of the plurality of pre-determined effective memory addresses accessed by the process. The specific process thread software code can optionally co-ordinate execution of the process between the first processor core and the second processor core, perform runtime profiling, perform book-keeping for dynamic resource allocation, debug the process or insert a breakpoint, among other functions. In one embodiment, the exception software handler executes the specific process thread software without synchronization.

Using the software-managed ERAT tables to perform synchronization avoids the overhead of separate synchronization operations and avoids inserting explicit synchronization instructions for producer code in producer-consumer synchronization. In addition, the structure of the original code is preserved, making it more amenable to complier optimization. The synchronization mechanism can be used for multiple purposes, including coordinating execution among multiple processes, runtime profiling for iterative optimization, book-keeping for dynamic resource allocation and debugging.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to apparatus (systems) and computer program products according to embodiments of the invention. It will be understood that each description and illustration can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The schematic illustrations and block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for synchronizing processor cores in a multi-core computer processing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for synchronizing cores in a multi-core computing environment, the method comprising:
   executing a software application on a plurality of processor cores, the plurality of processor cores comprising an accelerator core executing producer code and a host core;
   identifying a synchronization point in the producer code using a memory access to a pre-determined effective memory address that guarantees an effective-to-real address translation miss;
   invoking the host core to perform an address translation for the pre-determined effective memory address;
   registering a software handler that executes on the host core in response to an interrupt received on the host core; and
   using the address translation for the pre-determined effective memory address to achieve synchronization between the accelerator core and the host core by using the software handler to initiate execution of consumer code on the host core.

2. The method of claim 1, wherein invoking the host core to perform an address translation comprises accessing the pre-determined effective memory address during execution of the producer code on the accelerator core.

3. The method of claim 1, wherein using the address translation for the pre-determined effective memory address to achieve synchronization further comprises:
   accessing the pre-determined effective memory address to generate the effective-to-real address translation miss; and
   receiving an interrupt on the host core resulting from the effective-to-real address translation miss.

4. The method of claim 3, wherein using the address translation for the pre-determined effective memory address to achieve synchronization further comprises:
   executing the software handler on the host core in response to receiving the interrupt; and
   using execution of the software handler to initiate execution of the consumer code.

5. The method of claim 3, wherein:
   the method further comprising maintaining an effective-to-real address translation table without a corresponding real memory address translation entry for the pre-determined effective memory address; and
   using the address translation for the pre-determined effective memory address to achieve synchronization further comprises using execution of the software handler to provide the corresponding real memory address translation entry for the effective-to-real address translation table.

6. The method of claim 3, wherein the method further comprises using the software handler to execute a specific process thread software code.

7. The method of claim 6, wherein executing the specific process thread software code co-ordinates execution of the process between the first processor core and the second processor core, performs runtime profiling, performs book-keeping for dynamic resource allocation, debugs the process or inserts a breakpoint.

8. The method of claim 1, the method further comprising maintaining an effective-to-real address translation table without a corresponding real memory address translation entry for the pre-determined effective memory address.

9. The method of claim 8, wherein maintaining the effective-to-real address translation table further comprises maintaining the effective-to-real address translation table at the accelerator core.

10. The method of claim 1, wherein invoking the host core to perform an address translation further comprises using an operating system running on the host core to perform the address translation.

11. A computer-readable storage medium containing computer readable code that when read by a computer causes the computer to perform a method for synchronizing cores in a multi-core computing environment, the method comprising:
executing a software application on a plurality of processor cores, the plurality of processor cores comprising an accelerator core executing producer code and a host core;
identifying a synchronization point in the producer code using a memory access to a pre-determined effective memory address that guarantees an effective-to-real address translation miss;
invoking the host core to perform an address translation for the pre-determined effective memory address;
registering a software handler that executes on the host core in response to an interrupt received on the host core; and
using the address translation for the pre-determined effective memory address to achieve synchronization between the accelerator core and the host core by using the software handler to initiate execution of consumer code on the host core.

12. The computer-readable medium of claim 11, wherein invoking the host core to perform an address translation comprises accessing the pre-determined effective memory address during execution of the producer code on the accelerator core.

13. The computer-readable medium of claim 11, wherein using the address translation for the pre-determined effective memory address to achieve synchronization further comprises:
accessing the pre-determined effective memory address to generate the effective-to-real address translation miss; and
receiving an interrupt on the host core resulting from the effective-to-real address translation miss.

14. The computer-readable medium of claim 13, wherein using the address translation for the pre-determined effective memory address to achieve synchronization further comprises:
executing the software handler on the host core in response to receiving the interrupt; and
using execution of the software handler to initiate execution of the consumer code.

15. The computer-readable medium of claim 13, wherein:
the method further comprising maintaining an effective-to-real address translation table without a corresponding real memory address translation entry for the pre-determined effective memory address; and
using the address translation for the pre-determined effective memory address to achieve synchronization further comprises using execution of the software handler to provide the corresponding real memory address translation entry for the effective-to-real address translation table.

16. The computer-readable medium of claim 13, wherein the method further comprises using the software handler to execute a specific process thread software code.

17. The computer-readable medium of claim 16, wherein executing the specific process thread software code co-ordinates execution of the process between the first processor core and the second processor core, performs runtime profiling, performs book-keeping for dynamic resource allocation, debugs the process or inserts a breakpoint.

18. The computer-readable medium of claim 11, the method further comprising maintaining an effective-to-real address translation table without a corresponding real memory address translation entry for the pre-determined effective memory address.

19. The computer-readable medium of claim 18, wherein maintaining the effective-to-real address translation table further comprises maintaining the effective-to-real address translation table at the accelerator core.

20. The computer-readable medium of claim 11, wherein invoking the host core to perform an address translation further comprises using an operating system running on the host core to perform the address translation.

* * * * *